US009688205B2

(12) United States Patent
Du et al.

(10) Patent No.: US 9,688,205 B2
(45) Date of Patent: Jun. 27, 2017

(54) VEHICLE STEP APPARATUS AND MOTOR ASSEMBLY THEREOF

(71) Applicant: T-MAX (HANGZHOU) INDUSTRIAL CO., LTD., Fuyang (CN)

(72) Inventors: Xinfa Du, Fuyang (CN); Qi Zhang, Fuyang (CN); Yiming Wang, Fuyang (CN)

(73) Assignee: T-MAX (HANGZHOU) INDUSTRIAL CO., LTD, Hangzhou (CN)

( * ) Notice: Subject to any disclaimer, the term of this patent is extended or adjusted under 35 U.S.C. 154(b) by 0 days.

(21) Appl. No.: 14/929,699

(22) Filed: Nov. 2, 2015

(65) Prior Publication Data

US 2017/0036605 A1  Feb. 9, 2017

(30) Foreign Application Priority Data

Aug. 4, 2015 (CN) .......................... 2015 1 0468824
Aug. 4, 2015 (CN) ..................... 2015 2 0576675 U (51) Int. Cl.
*B60R 3/02* (2006.01)

(52) U.S. Cl.
CPC ..................... *B60R 3/02* (2013.01)

(58) Field of Classification Search
CPC .................................. B60R 3/02; B60R 3/002
(Continued)

(56) References Cited

U.S. PATENT DOCUMENTS 694,572 A * 3/1902 Peyton ...................... B60R 3/02
  182/89
752,031 A * 2/1904 Chadwick ................. B60R 3/02
  280/166

(Continued)

FOREIGN PATENT DOCUMENTS

CN 101318485 A 12/2008
CN 101947935 A 1/2011

(Continued)

OTHER PUBLICATIONS

International Search Report and Written Opinion of the International Searching Authority for PCT International Application No. PCT/CN2015/097931 mailed May 10, 2016.

(Continued)

*Primary Examiner* — J. Allen Shriver, II
*Assistant Examiner* — Brian Cassidy
(74) *Attorney, Agent, or Firm* — Howard & Howard Attorneys PLLC (57) ABSTRACT

A vehicle step apparatus for a vehicle and a motor assembly thereof are provided. The vehicle step apparatus includes: a extending and retracting device including a mounting support, a vehicle step support and an arm assembly, the arm assembly being connected between the mounting support and the vehicle step support and configured to drive the vehicle step support to move between an extending position and a retraction position; a vehicle step disposed at the vehicle step support; a motor disposed at the mounting support and including a motor shaft coupled with the arm assembly; and an elastic element configured to take an elastic deformation to store energy when the motor drives the vehicle step support to move towards the extension position, and to release energy to assist the motor in driving (Continued)

the extending and retracting device when the motor drives the vehicle step support towards the retraction position.

11 Claims, 8 Drawing Sheets

(58) Field of Classification Search
USPC .................................................. 280/163, 166
See application file for complete search history.

(56) References Cited

U.S. PATENT DOCUMENTS

| | | | |
|---|---|---|---|
| 4,068,542 A | 1/1978 | Brand et al. | |
| 4,275,664 A * | 6/1981 | Reddy | B61D 23/025 |
| | | | 105/426 |
| 6,435,534 B1 * | 8/2002 | Stone | B60R 3/002 |
| | | | 182/127 |
| 6,533,303 B1 * | 3/2003 | Watson | B60R 3/02 |
| | | | 182/150 |
| 6,557,911 B2 * | 5/2003 | Nelsen | E05B 81/14 |
| | | | 292/201 |
| 6,834,875 B2 * | 12/2004 | Leitner | B60R 3/02 |
| | | | 105/447 |
| 6,840,526 B2 * | 1/2005 | Anderson | B60R 3/02 |
| | | | 182/127 |
| 6,955,370 B2 * | 10/2005 | Fabiano | B60R 3/02 |
| | | | 280/163 |
| 6,990,873 B2 * | 1/2006 | Rennen | F02D 9/1065 |
| | | | 185/11 |
| 7,007,961 B2 * | 3/2006 | Leitner | B60R 3/02 |
| | | | 105/447 |
| 7,128,191 B2 * | 10/2006 | Fisher | E05B 81/25 |
| | | | 188/265 |
| 7,367,574 B2 * | 5/2008 | Leitner | B60R 3/02 |
| | | | 280/163 |
| 7,637,519 B2 * | 12/2009 | Leitner | B60R 3/02 |
| | | | 280/163 |
| 7,740,260 B2 * | 6/2010 | VanBelle | B60R 3/02 |
| | | | 180/90.6 |
| 7,740,261 B2 * | 6/2010 | Leitner | B60R 3/02 |
| | | | 280/163 |
| 7,775,473 B2 * | 8/2010 | Mori | B60R 22/46 |
| | | | 242/374 |
| 7,976,042 B2 * | 7/2011 | Watson | B60R 3/02 |
| | | | 280/166 |
| 8,042,821 B2 * | 10/2011 | Yang | B60R 3/02 |
| | | | 280/163 |
| 8,056,913 B2 * | 11/2011 | Kuntze | B60R 3/02 |
| | | | 280/163 |
| 8,469,380 B2 * | 6/2013 | Yang | B60R 3/02 |
| | | | 182/127 |
| 8,544,811 B2 * | 10/2013 | Theis | F16M 11/04 |
| | | | 248/176.1 |
| 8,668,217 B2 * | 3/2014 | Ziaylek | B60R 3/02 |
| | | | 280/163 |
| D713,772 S * | 9/2014 | Ziaylek | D12/203 |
| 8,870,207 B2 * | 10/2014 | Parvey | B62J 25/00 |
| | | | 180/219 |
| 9,176,517 B2 * | 11/2015 | Pelletier | G05G 1/38 |
| 9,346,405 B2 * | 5/2016 | Leitner | B60R 3/02 |
| 2002/0096889 A1 * | 7/2002 | Nelsen | E05B 81/14 |
| | | | 292/201 |
| 2003/0094781 A1 * | 5/2003 | Jaramillo | B60R 3/02 |
| | | | 280/166 |
| 2005/0173886 A1 * | 8/2005 | Leitner | B60R 3/02 |
| | | | 280/166 |
| 2006/0219484 A1 * | 10/2006 | Ogura | B60K 25/10 |
| | | | 185/39 |
| 2008/0042396 A1 * | 2/2008 | Watson | B60R 3/02 |
| | | | 280/166 |
| 2008/0100024 A1 | 5/2008 | Leitner et al. | |
| 2009/0295115 A1 | 12/2009 | Yang et al. | |
| 2012/0025485 A1 | 2/2012 | Yang et al. | |
| 2013/0234488 A1 * | 9/2013 | Pleskot | B60N 2/22 |
| | | | 297/354.12 |
| 2016/0262969 A1 * | 9/2016 | Ohta | A61H 3/00 |
| 2017/0021781 A1 | 1/2017 | Du et al. | |
| 2017/0036605 A1 | 2/2017 | Du et al. | |
| 2017/0036606 A1 | 2/2017 | Du et al. | |
| 2017/0036607 A1 | 2/2017 | Du et al. | |
| 2017/0036608 A1 | 2/2017 | Du et al. | |

FOREIGN PATENT DOCUMENTS

| | | |
|---|---|---|
| CN | 203211209 U | 9/2013 |
| CN | 105083137 A | 11/2015 |
| CN | 105128751 A | 12/2015 |
| CN | 204895311 U | 12/2015 |
| WO | 2006050297 A2 | 5/2006 |

OTHER PUBLICATIONS

Notification of First Office Action issued by the State Intellectual Property Office for Chinese Patent Application No. 201580003810.5 dated Nov. 28, 2016.

* cited by examiner

VEHICLE STEP APPARATUS AND MOTOR ASSEMBLY THEREOF

CROSS-REFERENCE TO RELATED APPLICATION

This application claims priority to and benefits of Chinese Patent Application Serial No. 201510468824.6 and No. 201520576675.0, both filed with the State Intellectual Property Office of P. R. China on Aug. 4, 2015, the entire contents of which are incorporated herein by reference.

FIELD

Embodiments of the present invention generally relate to a vehicle technology field, and more particularly, to a vehicle step apparatus and a motor assembly thereof.

BACKGROUND

A vehicle step apparatus mounted on a chassis of a vehicle is used to assist passengers to get on or off the vehicle. An extending and retracting device of a vehicle step apparatus is driven by a motor so as to drive the step to move between an extending position and a retracting position.

Since a load of the vehicle step apparatus in the process of the extending and retracting device extending towards the extending position (i.e., an extending process) is different from that of the vehicle step apparatus in the process of the extending and retracting device retracting towards the retracting position (i.e., a retracting process), a current of the motor in an extending process is different from that of the motor in a retracting process, so that a working life of the motor is affected.

SUMMARY

Embodiments of the present invention seek to solve at least one of the problems existing in the related art to at least some extent. Accordingly, an object of the present invention is to provide a motor assembly of a vehicle step apparatus, which has a long working life.

Another object of the present invention is to provide a vehicle step apparatus, which includes the above motor assembly.

Embodiments of a first aspect of the present invention provide a vehicle step apparatus, including: an extending and retracting device comprising a mounting bracket, a step bracket, and an arm assembly coupled between the mounting bracket and the step bracket and configured to drive the step bracket to move between an extending position and a retracting position; a step mounted on the step bracket; a motor mounted on the mounting bracket, and having a casing and a motor shaft coupled with the arm assembly to drive the arm assembly; and an elastic member configured to be elastically deformed so as to store energy when the motor drives the extending and retracting device to move towards the extending position, and to release energy so as to assist the motor to drive the extending and retracting device when the motor drives the extending and retracting device to move towards the retracting position.

With the vehicle step apparatus according to embodiments of the first aspect of the present invention, the load of the motor in the processes of driving the step to retract is balanced with that of the motor in the processes of driving the step to extend.

Embodiments of a second aspect of the present invention provide a motor assembly of a vehicle step apparatus, including: a motor comprising a motor shaft and a casing; a cover disposed on the casing to define a cavity; a connection plate disposed within the cavity and driven by the motor shaft to rotate; and an elastic element defining a first end connected to the cover and a second end connected to the connection plate, and configured to be elastically deformed to store energy when the motor shaft rotates in a first direction and to release energy to assist the motor shaft to rotate in a second direction opposite to the first direction when the motor shaft rotates in the second direction.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which.

DETAILED DESCRIPTION

Reference will be made in detail to embodiments of the present invention. The embodiments described herein with reference to drawings are explanatory, illustrative, and used to generally understand the present invention. The embodiments shall not be construed to limit the present invention. The same or similar elements and the elements having same or similar functions are denoted by like reference numerals throughout the descriptions.

In the specification, unless specified or limited otherwise, relative terms such as "central", "longitudinal", "lateral", "front", "rear", "right", "left", "inner", "outer", "lower", "upper", "horizontal", "vertical", "above", "below", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present invention be constructed or operated in a particular orientation.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. In addition, terms such as "first" and "second" are used herein for purposes of description and are not intended to indicate or imply relative importance or significance.

In the description of the present invention, a structure in which a first feature is "on" a second feature may include an embodiment in which the first feature directly contacts the second feature, and may also include an embodiment in which an additional feature is formed between the first feature and the second feature so that the first feature does not directly contact the second feature, unless specified otherwise. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature is at a height higher than that of the second feature. While a first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature is at a height lower than that of the second feature.

A vehicle step apparatus 100 according to embodiments of the present invention will be described in the following with reference to drawings. The vehicle step apparatus 100 according to embodiments of the present invention includes an extending and retracting device 10, a step 20, an electric motor 30 and an elastic element 40.

The extending and retracting device 10 includes a mounting bracket 11, a step bracket 12 and an arm assembly 13. The arm assembly 13 is coupled between the mounting bracket 11 and the step bracket 12 and configured to drive the step bracket 12 to move between an extending position and a retracting position.

The step 20 is mounted to the step bracket 12. The motor 30 is mounted on the mounting bracket 11 and includes a motor shaft 32 and a casing 31. The motor shaft 32 is coupled with the arm assembly 13 so as to drive the arm assembly 13. The elastic element 40 is configured to be elastically deformed so as to store energy when the motor 30 drives the extending and retracting device 10 to move towards the extending position, and to release energy to assist the motor 30 to drive the extending and retracting device 10 when the motor 30 drives the extending and retracting device 10 to move towards the retracting position.

With the vehicle step apparatus according to embodiments of the present invention, the motor 30 drives the arm assembly 13 of the extending and retracting device 10 to move, so as to drive the step bracket 12 coupled with the arm assembly 13 to move, and finally a driving force of the motor 30 is transmitted to the step 20 coupled with the step bracket 12 so as to drive the step 20 to extend and retract.

It may be understood that, the load of the motor 30 in the process of driving the step 20 to retract is bigger than that of the motor 30 in the process of driving the step 101 to extend so that the working current of the motor 30 in the process of driving the step 20 to retract is larger than that of the motor 30 in the process of driving the step 20 to extend.

With the vehicle step apparatus 100 according to embodiments of the present invention, when the step 20 is extended, the motor shaft 32 drives the elastic element 40 to move and makes the elastic element 40 be elastically deformed so as to store energy.

When the step 20 is retracted, the elastic element 40 releases energy to assist the motor 30 in driving the extending and retracting device 10, so that the load and the working current of the motor 30 are decreased in the process of driving the step 20 to retract. Thus, the working current of the motor 30 in the processes of driving the step 20 to retract is generally consistent with that of the motor 30 in the processes of driving the step 20 to extend, the motor 30 is protected effectively and the working life of the more 30 is prolonged.

The vehicle step apparatus 100 according to embodiments of the present invention will be described in the following with reference to FIGS. 1 to 6.

Figure 1:
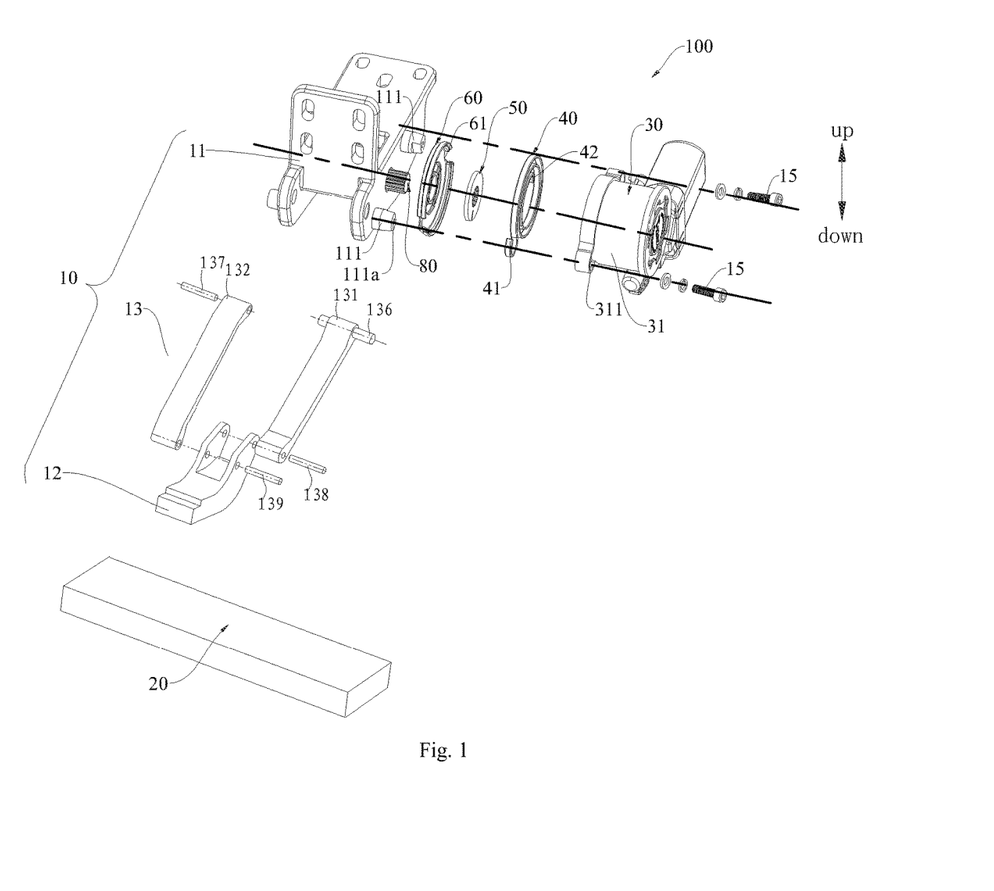
FIG. 1 is an exploded view of a vehicle step apparatus according to an embodiment of the present invention.

FIG. 1 is an exploded view of the vehicle step apparatus 100 according to an embodiment of the present invention. As shown in FIG. 1, the vehicle step apparatus 100 includes the extending and retracting device 10, the vehicle step 20, the motor 30 and the elastic element 40.

The extending and retracting device 10 includes the mounting bracket 11, the step bracket 12 and the arm assembly 13. The arm assembly 13 is coupled between the mounting bracket 11 and the step bracket 12, and configured to drive the step bracket 12 to move between the extending position and the retracting position.

The step 20 is disposed on the step bracket 12. The motor 30 is disposed on the mounting bracket 11 and includes the motor shaft 32 and the casing 31. The motor shaft 32 is coupled with the arm assembly 13 so as to drive the arm assembly 13. The elastic element 40 is configured to be elastically deformed to store energy when the motor 30 drives the step bracket 12 to move towards the extending position, and to release energy to assist the motor 30 in driving the extending and retracting device 10 when the motor 30 drives the step bracket 12 towards the retracting position.

When the vehicle step apparatus 100 is used, the mounting bracket 11 is fixed to a vehicle, for example the mounting bracket 11 is fixed to a chassis of the vehicle. At least one arm of the arm assembly 13 is pivotally coupled with the mounting bracket 11, and the motor shaft 32 is coupled with an arm of the arm assembly 13 so as to drive the arm assembly 13 to move, further to drive the step bracket 12 coupled with the arm assembly 13 to move. Thus, the motor 30 rotates clockwise to drive the extending and retracting device 10 to extend and rotates counterclockwise to drive the extending and retracting device 10 to retract.

In an embodiment of the present invention, the elastic element 40 is a scroll spring, and the scroll spring defines a first end and a second end. The first end 41 of the scroll spring is fixed, and the second end 42 of the scroll spring is driven by the motor shaft 32 to twist.

Specifically, as shown in FIG. 1, an end of the outermost ring of the scroll spring is bent outwards to form the first end 41, and an end of an innermost ring of the scroll spring is bent inwards to form the second end 42. The first end 41 includes the end of the outermost ring of the scroll spring and a portion of the outermost ring coupled with the end of the outermost ring, and correspondingly, the second end 42 includes the end of the innermost ring of the scroll spring and a portion of the innermost ring coupled with the end of the innermost ring.

When the extending and retracting device 10 (i.e., the step 20) is extended, the first end 41 of the scroll spring is fixed, and the second end 42 of the scroll spring rotates along with the motor shaft 32 and is twisted tightly to store energy.

When the extending and retracting device 10 (i.e., the step 20) is retracted, the first end 41 of the scroll spring is fixed, and the second end 42 of the scroll spring rotates along with the motor shaft 32 and releases energy so as to assist the motor 30 to drive the extending and retracting device 10 to retract. In addition, the elastic element 40 is configured as the scroll spring, and the scroll spring has a simple and compact structure and is easy to be mounted.

However, the present invention is not limited to this, and the elastic element 40 may be a spring leaf, a belleyille spring or other units or parts easy to be deformed elastically. Those skilled in the related art may choose a scroll spring in a suitable size according to a difference between the load of the motor 30 in the process of driving the step 20 to extend and that of the motor 30 in the process of driving the step 20 to extend, so that the scroll spring can better balance the load of the motor 30 in the process of driving the step 20 to extend with that of the motor 30 in the process of driving the step 20 to extend.

In some embodiments, as shown in FIG. 1, the vehicle step apparatus 100 further includes a first connection plate 50 and a first cover 60. A first recess is formed in a casing 31 of the motor 30, and the first recess is covered by the first cover 60 to define a cavity. The first connection plate 50 is mounted in the cavity and driven by the motor shaft 32 to rotate. The scroll spring is mounted within the cavity, the first end 41 of the scroll spring is fixed in the first cover 60 and the second end 42 of the scroll spring is coupled with the first connection plate 50.

Furthermore, the first cover 60 is detachably fastened to the casing 31. A limitation notch 61 is formed in the first cover 60, a limiting column 111 is formed on the mounting bracket 11, and the limiting column 111 is fitted within the limiting notch 61 to mount the first cover 60 on the mounting bracket 11, and the first end 41 of the scroll spring is fitted over the limiting column 111.

With reference to FIG. 1, the first recess is formed in a side of the casing 31 facing the mounting bracket 11, and the first cover 60 includes a cover body and a flange coupled with an edge of the cover body. A stepped positioning surface is formed on an inner wall of the flange, and the first cover 60 covers the first recess via the stepped positioning surface. The limiting notch 61 extends inwards from an edge of the first cover 60.

The limiting column 111 is formed on a side of the mounting bracket 11 opposing to the motor 30, and a catch groove fitted with the limitation notch 61 is formed in the limitation column 111. The first cover 60 bears against the casing 31 via bottom surfaces of the catch grooves of two limitation columns 111 so as to limit the first cover 60 in the axial direction. Side surfaces of the catch grooves of two limitation column 111 limit the first cover 60 in both the radial direction and the circumferential direction. The second end 42 of the scroll spring is passed through the limiting notch 61 and fitted over the limiting column 111.

Therefore, the first cover 60, the casing 31 and the mounting bracket 11 are fixed with one another so as to provide a suitable position for fixing the second end 42 of the scroll spring.

Specially, the first connection plate 50 is configured as a substantially circular plate. The first connection plate 50 is disposed within the cavity, and the first connection plate 50 defines a first surface opposing to the first recess and a second surface opposing to the first cover 60. The first connection plate 50 is coupled with the motor shaft 32 directly or indirectly, so that the first connection plate 50 can rotate under the drive of the motor shaft 32. The scroll spring is fitted over the first connection plate 50, and the second end 42 of the scroll spring is connected to the first connection plate 50 and rotates along with the first connection plate 50 in a same direction.

Therefore, the scroll spring can be integrated in the motor 30 so as to decrease transmission loss and make the structure of the vehicle step apparatus 100 more compactly.

It may be understood by those skilled in the related that, the first connection plate 50, the first cover 60 and the first recess may have a circular shape or an oval shape. A number of each of the limiting notch 61 and the limiting column 111 is not limited to two, and when there are more than two limiting notches 61, the limiting notches 61 are provided and evenly spaced apart from each other along a circumferential direction of the first cover 60.

In some embodiments, a first catch groove 51 is formed in an outer circumferential surface of the first connection plate 50, and the second end 42 of the scroll spring is inserted into and fitted within the first catch groove 51. The motor shaft 32 is coupled with the arm assembly 13 via a first connection shaft 80. The first connection shaft 80 is coupled with the motor shaft 32 via spline coupling, and the first connection plate 50 is fitted over the first connection shaft 80 and coupled with the first connection shaft 80 via spline coupling.

Specifically, as shown in FIG. 1, the first catch groove 51 is extended inwards from the outer edge of the first connection plate 50, and the first catch groove 51 extends along the radial direction of the first connecting plate 50. A center of the first connection plate 50 has a first spline hole, and a center of the motor shaft 32 has a second spline hole. The first connection shaft 80 has an external spline, and the first connection shaft 80 is coupled with one arm of the arm assembly 13 and passed through the mounting bracket 11.

Therefore, the motor shaft 32 drives the first connection shaft 80 and the first connection plate 50 to rotate, and the second end 42 of the scroll spring fixed on the first connection plate 50 rotates along with the first connection plate 50, so that the scroll spring is gradually rolled up tightly, thus resulting in a simple and compact structure. In addition, the first connection shaft 80 is coupled with the motor shaft 32 and the first connecting plate 50 via spline connection so as to ensure driving force transmission and make installation and disassembly to be easy.

In some embodiments, a mounting hole 311 is formed in the casing 31, and the limitation column 111 is passed through the mounting hole 311. A threaded hole 111*a* is formed in the limitation column 111, and the motor 30 is mounted on the mounting bracket 11 via a bolt 15 fitted within the threaded hole 111*a*.

Specifically, the limitation column 111 is passed through the limitation notch 61 and bears against the casing 31. The mounting hole 311 of the casing 31 is opposite to the threaded hole 111*a* of the limitation column 111, and the bolt 15 is passed through the mounting hole 311 and is fitted within the threaded hole 111a so as to mount the casing 31 to the mounting bracket 11. Thus, the motor 30, the first connecting plate 50 and the mounting bracket 11 are mounted together via the bolt 15, and it is easy to change and maintain the scroll spring.

However, the present invention is not limited to this. The casing 31, the first connection plate 50 and the mounting bracket 11 may be fixed with one another by welding or other means.

Figure 2:
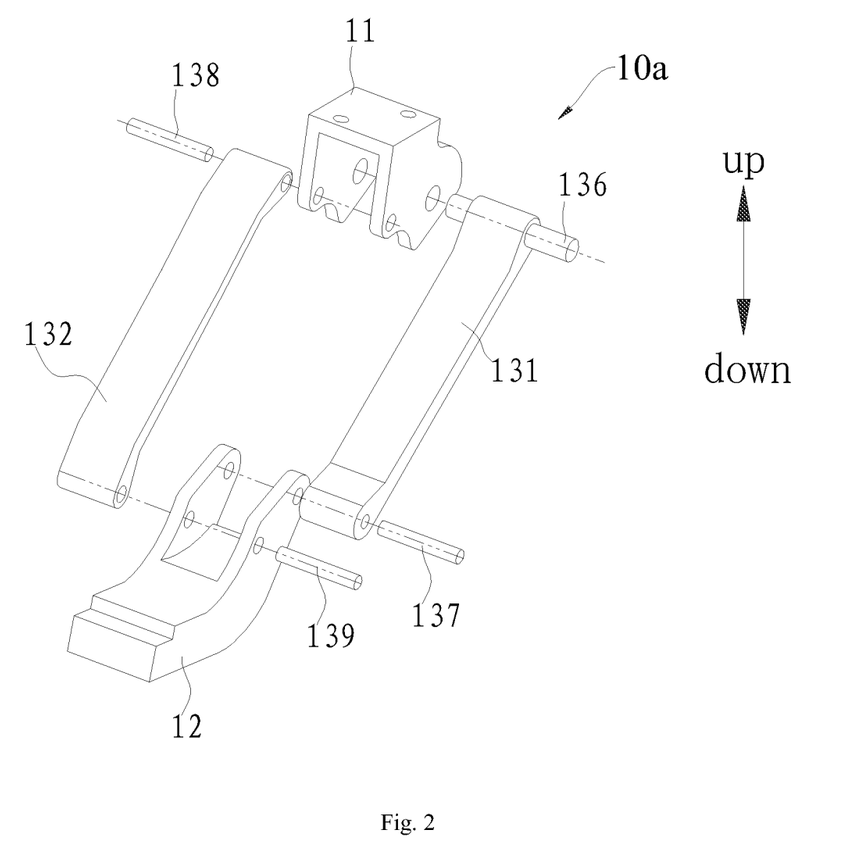
FIG. 2 is a schematic of an extending and retracting device of a vehicle step apparatus according to an embodiment of the present invention, wherein the extending and retracting device is a four-link mechanism.
Figure 3:
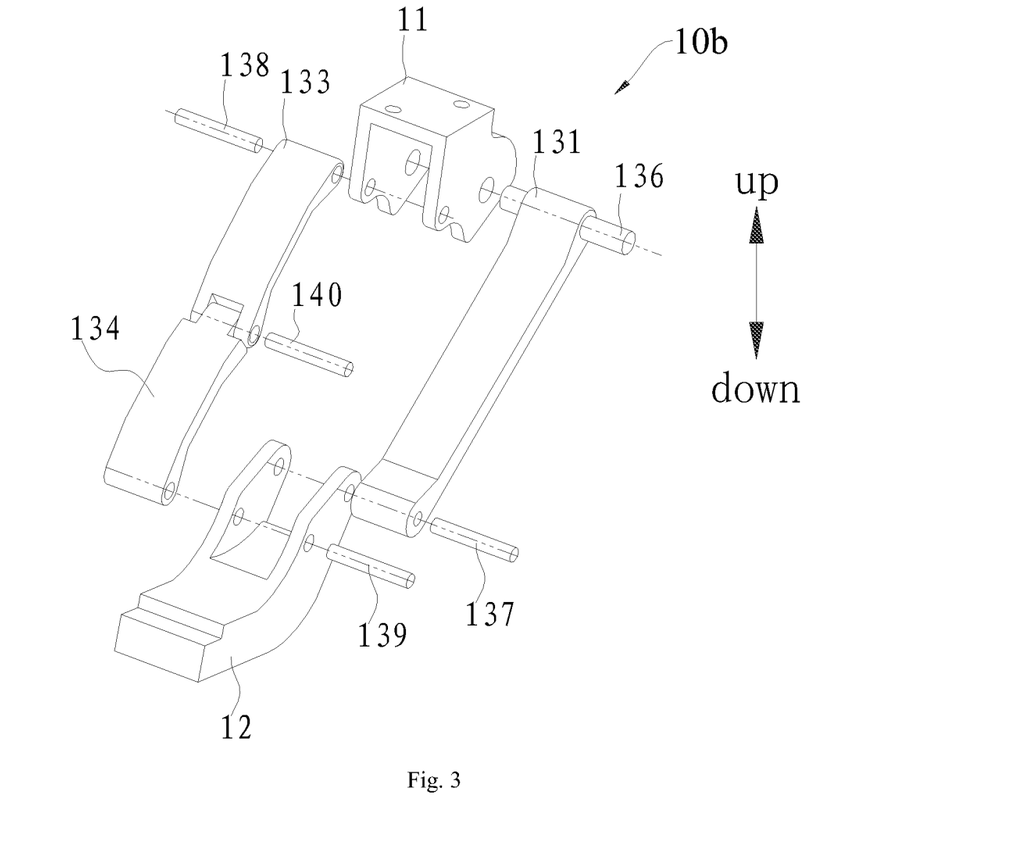
FIG. 3 is a schematic of an extending and retracting device of a vehicle step apparatus according to an embodiment of the present invention, wherein the extending and retracting device is a five-link mechanism.
Figure 4:
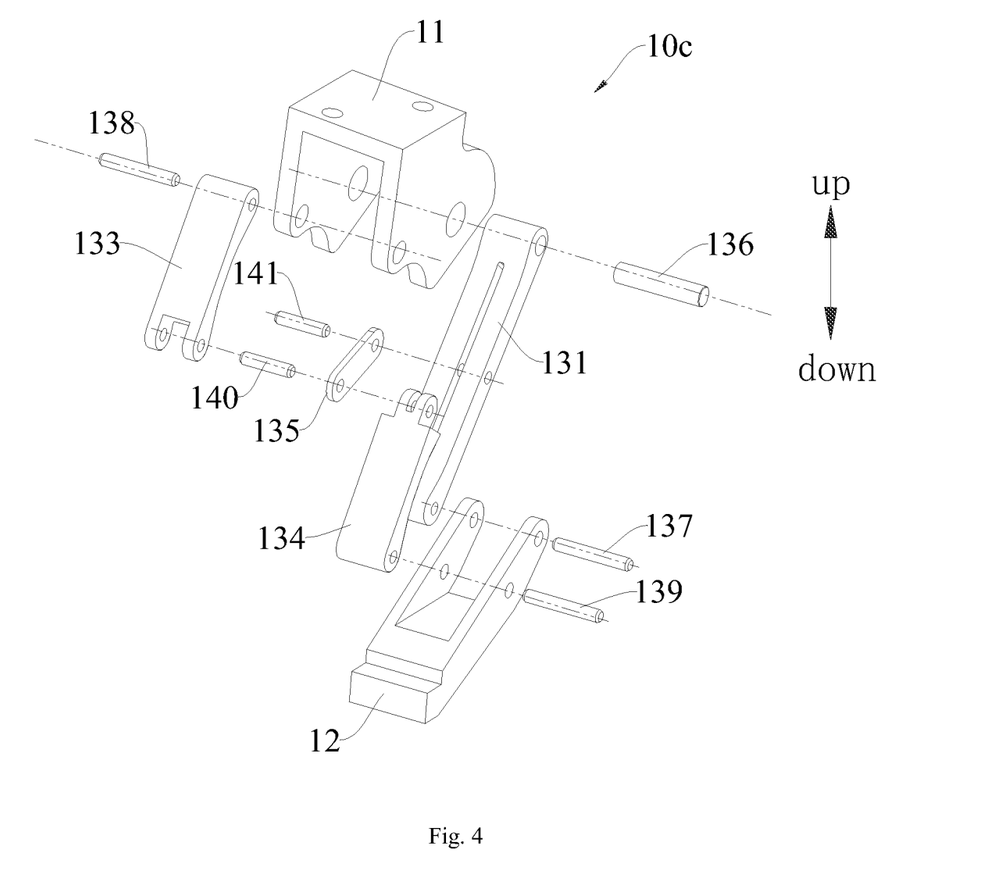
FIG. 4 is a schematic of an extending and retracting device of a vehicle step apparatus according to an embodiment of the present invention, wherein the extending and retracting device is a six-link mechanism.

In some embodiments of the present invention, the extending and retracting device 10 may be one of a four-link mechanism 10a, a five-link mechanism 10b and a six-link mechanism 10c.

In an embodiment shown in FIG. 2, the extending and retracting device 10 is a four-link mechanism 10a, and the extending and retracting device 10 comprises the mounting bracket 11, the step bracket 12 and the arm assembly 13. The arm assembly 13 is coupled between the mounting bracket 11 and the step bracket 12.

The arm assembly 13 comprises a first arm 131 and a second arm 132. An upper end of the first arm 131 is pivotally coupled with the mounting bracket 11 via a first connection pin 136, and a lower end of the first arm 131 is pivotally coupled with the step bracket 12 via a second connection pin 137. An upper end of the second arm 132 is pivotally coupled with the mounting bracket 11 via a third connection pin 138, and a lower end of the second arm 132 is pivotally coupled with the step bracket 12 via a fourth connection pin 139.

In an embodiment shown in FIG. 3, the extending and retracting device 10 is a five-link mechanism 10b, and the extending and retracting device 10 comprises the mounting bracket 11, the step bracket 12 and the arm assembly 13. The arm assembly 13 is coupled between the mounting bracket 11 and the step bracket 12. The arm assembly 13 comprises a first arm 131, a third arm 133 and a fourth arm 134.

An upper end of the first arm 131 is pivotally coupled with the mounting bracket 11 via a first connection pin 136, and a lower end of the first arm 131 is pivotally coupled with the step bracket 12 via a second connection pin 137. An upper end of the third arm 133 is pivotally coupled with the mounting bracket 11 via a third connection pin 138, and a lower end of the third arm 133 is pivotally coupled with an upper end of the fourth arm 134 via a fifth connection pin 140. A lower end of the fourth arm 134 is pivotally coupled with the step bracket 12 via a fourth connection pin 139.

In an embodiment shown in FIG. 4, the extending and retracting device 10 is a six-link mechanism 10c, and the extending and retracting device 10 comprises the mounting bracket 11, the step bracket 12 and the arm assembly 13. The arm assembly 13 is coupled between the mounting bracket 11 and the step bracket 12. The arm assembly 13 comprises a first arm 131, a third arm 133, a fourth arm 134 and a fifth arm 135.

An upper end of the first arm 131 is pivotally coupled with the mounting bracket 11 via a first connection pin 136, and a lower end of the first arm 131 is pivotally coupled with the step bracket 12 via a second connection pin 137. An upper end of the third arm 133 is pivotally coupled with the mounting bracket 11 via a third connection pin 138, and a lower end of the third arm 133 and an upper end of the fourth arm 134 are pivotally coupled with a first end of the fifth arm 135 via a fifth connection pin 140. The second end of the fifth arm 135 is pivotally coupled with a middle portion of the first arm 131 by a sixth connection pin 141. A lower end of the fourth arm 134 is pivotally coupled with the step bracket 12 via a fourth connection pin 139. In the embodiments of the above-mentioned extending and retracting device 10, the motor shaft 32 of the motor 30 is coupled with the first arm 131 or the second arm 132 via the first connection shaft 80 so as to drive it to rotate, and then the driving force of the motor 30 is finally transmitted to the step bracket 12 so as to drive the step bracket 12 to extend and retract.

In an embodiment of the present invention, the extending and retracting device 10 includes a first extending and retracting device 10d and a second extending and retracting device 10e, and the motor 30 includes a first motor 30a and a second motor. The step 20 is mounted to the step brackets 12 of the first extending and retracting device 10d and the second extending and retracting device 10e. The first motor 30a is coupled with the arm assembly 13 of the first extending and retracting device 10d, and the second motor is coupled with the arm assembly 13 of the second extending and retracting device 10e.

Specifically, the scroll spring is coupled between at least one of the first motor 30a and the second motor and the corresponding mounting bracket 11, and the motor shaft 32 of each motor 30 is coupled with one arm of the corresponding arm assembly 13. Therefore, when the step 20 has a large length dimension, the motion stability of the step 20 can be improved by driving the step 20 with the first motor 30a and second motor, and the first and second extending and retracting devices 10d, 10e connected with the step 20.

In the process of driving the step 20 to extend, the elastic element 40 is compressed to store energy, and the two motor shafts 32 rotate in the same direction synchronously to drive the arms of the corresponding arm assemblies 13 to rotate, so that the arm assemblies 13 transmit the driving force to the step bracket 12, and the step bracket 12 moves to the extending position in a predetermined track.

In the process of driving the step 20 to retract, the elastic element 40 releases energy to assist the two motors 30, and the two motor shafts 32 to rotate in the same reverse direction synchronously to drive the arms of the corresponding arm assemblies 13, so that the arm assemblies 13 transmit the driving force to the step bracket 12, and the step bracket 12 moves to the retracting position in a predetermined track. The working current of the motor 30 in the process of driving the step 20 to retract is decreased so as to balance the work current of the motor 30 in the process of driving the step 20 to retract with the work current of the motor 30 in the process of driving the step 20 to extend and to prolong work-life of the motor 30.

In another embodiment of the present invention, the extending and retracting device 10 includes a first extending and retracting device 10d and a second extending and retracting device 10e, and one motor 30 is provided. The step 20 is mounted to the step brackets 12 of the first extending and retracting device 10d and the second extending and retracting device 10e.

The motor 30 is coupled with the arm assembly 13 of the first extending and retracting device 10d, and the motor shaft 32 of the motor 30 is coupled with the arm assembly 13 of the second extending and retracting device 10e via a transmission shaft 70.

Specifically, the motor 30 is coupled with one arm of the arm assembly 13 of the first extending and retracting device 10d, and the motor shaft 32 of the motor 30 is coupled with one arm of the arm assembly 13 of the second extending and retracting device 10e via a transmission shaft 70. In this way, one motor may be omitted, thus the manufacturing cost of the vehicle step apparatus 100 is decreased. In addition, it is easy to control a single motor.

In another embodiment of the present invention, the extending and retracting device 10 includes a first extending and retracting device 10d and a second extending and retracting device 10e, and one motor 30 is provided. The step 20 is mounted to the step brackets 12 of the first extending and retracting device 10d and the second extending and retracting device 10e.

The motor 30 is coupled with the arm assembly 13 of the first extending and retracting device 10d via the first connection shaft 80, and coupled with the arm assembly 13 of the second extending and retracting device 10e via a transmission shaft 70 and a second connection shaft 90.

The elastic element 40 includes a first scroll spring and a second scroll spring. The first scroll spring is coupled between the mounting bracket 11 of the first extending and retracting device 10d and the motor 30, and the second scroll spring is disposed at an outside of the mounting bracket 11 of the second extending and retracting device 10e away from the mounting bracket 11 of the first extending and retracting device 10d. The amount of energy stored in the elastic element 40 is increased by increasing the number of the scroll springs, so as to assist the motor 30 and balance twisting forces at two sides of the transmission shaft 70.

Figure 5:
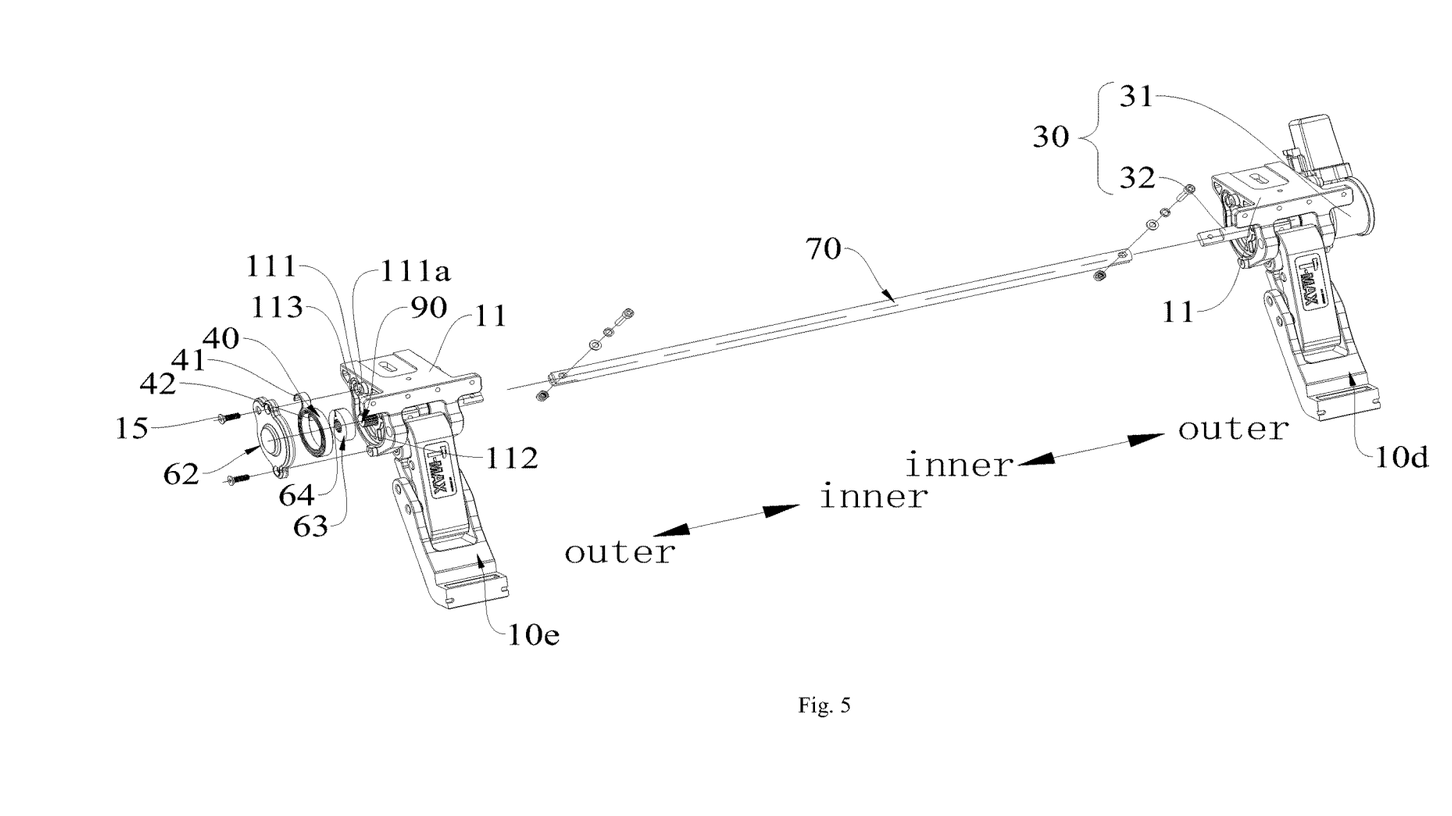
FIG. 5 is a schematic view of a vehicle step apparatus according to another embodiment of the present invention, wherein an extending and retracting device is in an extending position.

FIG. 5 is a schematic view of the vehicle step apparatus 100 according to another embodiment of the present invention, in which the extending and retracting device 10 (i.e., the step 20 and the step bracket 12) is in the extending position. In the embodiment shown in FIG. 5, the extending and retracting device 10 includes a first extending and retracting device 10d and a second extending and retracting device 10e, and one motor 30 is provided. The step 20 is mounted on the step brackets 12 of the first extending and retracting device 10d and the second extending and retracting device 10e.

The motor 30 is coupled with the arm assembly 13 of the first extending and retracting device 10d via the first connection shaft 80, and coupled with the arm assembly 13 of the second extending and retracting device 10e via a transmission shaft 70 and a second connection shaft 90.

The elastic element 40 is the scroll spring, and one scroll spring is provided. The one scroll spring is disposed at an outside of the mounting bracket 11 of the second extending and retracting device 10e. The first end 41 of the scroll spring is fixed, and the second end 42 of the scroll spring is driven by the motor shaft 32 to twist via the transmission shaft 70.

In other words, the first connection shaft 80 is coupled with one arm of the arm assembly 13 of the first extending and retracting device 10d, the second connection shaft 90 is coupled with one arm of the arm assembly 13 of the second extending and retracting device 10e, and the motor shaft 32 drives the corresponding arm assemblies 13 to move via the first connection shaft 80 and the second connection shaft 90 respectively. The scroll spring and the motor 30 are located outside the first and second extending and retracting devices 10d, 10e respectively.

Figure 6:
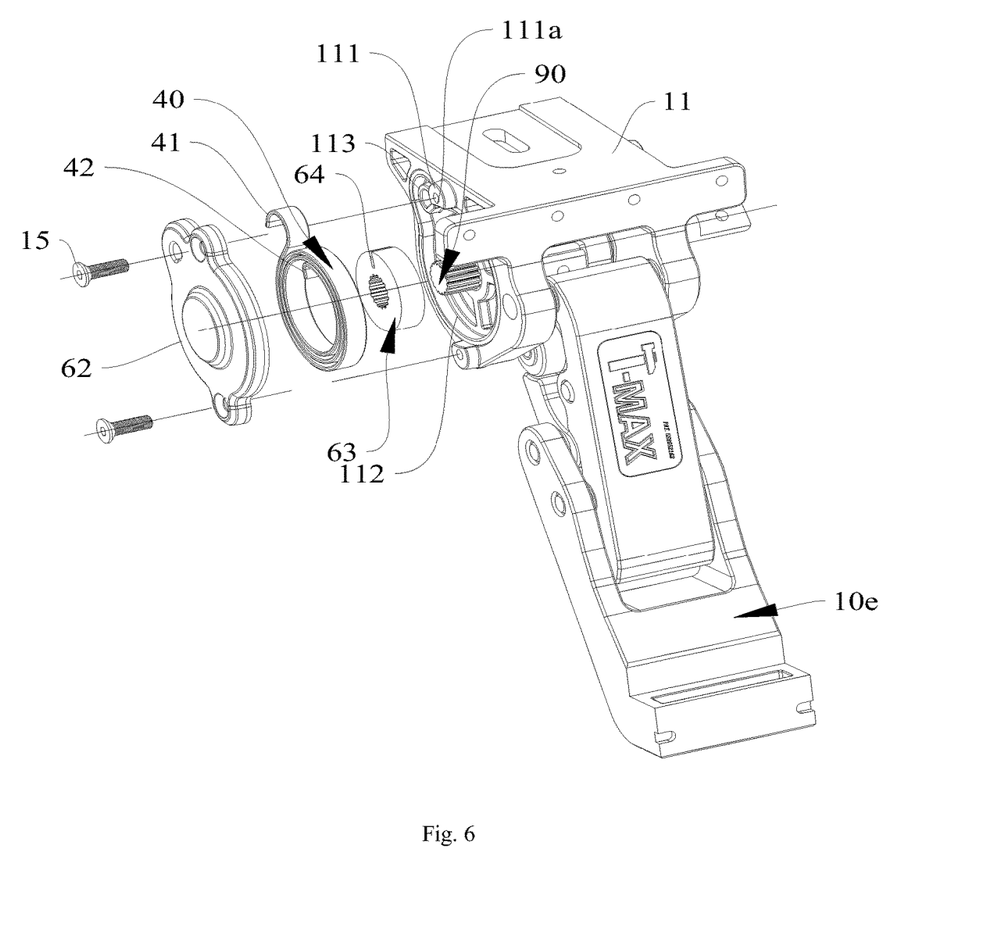
FIG. 6 is a partial enlarged view of a scroll spring and the extending and retracting device in FIG. 5.

Furthermore, as shown in FIG. 6, a second recess 112 is formed in an outside of the mounting bracket 11 of the second extending and retracting device 10e away from the mounting bracket 11 of the first extending and retracting device 10d, and the second recess 112 is covered by a second cover 62. The second connection shaft 90 defines a first end coupled with the transmission shaft 70, and a second end extended beyond the outside of the mounting bracket 11 of the second extending and retracting device 10e and coupled with a second connection plate 63 via splined coupling. That is to say, the second connection plate 63 is fitted over the second end of the second connection shaft 90 via splined coupling.

A second catch groove 64 is formed in an outer peripheral surface of the second connection plate 63. A catch column 113 is formed on the outside of the mounting bracket 11 of the second extending and retracting device 10e, and is disposed in the second recess 112. The scroll spring is disposed in the second recession 112, and the first end 41 of the scroll spring is fitted over the catch column 113 and the second end 42 of the scroll spring is inserted into the second catch groove 64 and fitted therein.

Therefore, the motor shaft 32 rotates and drives the first connection shaft 80, the transmission shaft 70, the second connection shaft 90 and the second connection plate 63 to rotate together in the same direction, so that the scroll spring rotates and twists in the same direction.

Operations of the vehicle step apparatus 100 according to embodiments of the present invention will be described in the following with reference to FIGS. 5-7.

As shown in FIGS. 5 and 6, the motor shaft 32 rotates and drives the transmission shaft 70 and one arm of the arm assembly 13 coupled with the motor shaft 32 to rotate. The transmission shaft 70 drives one arm of the arm assembly 13 coupled with the transmission shaft 70, so that the two arm assemblies 13 transmit the driving force to the step bracket 12, and the step bracket 12 (i.e., the step 20) moves to the extending position in the predetermined track, in which the elastic element 40 is compressed to store energy.

Figure 7:
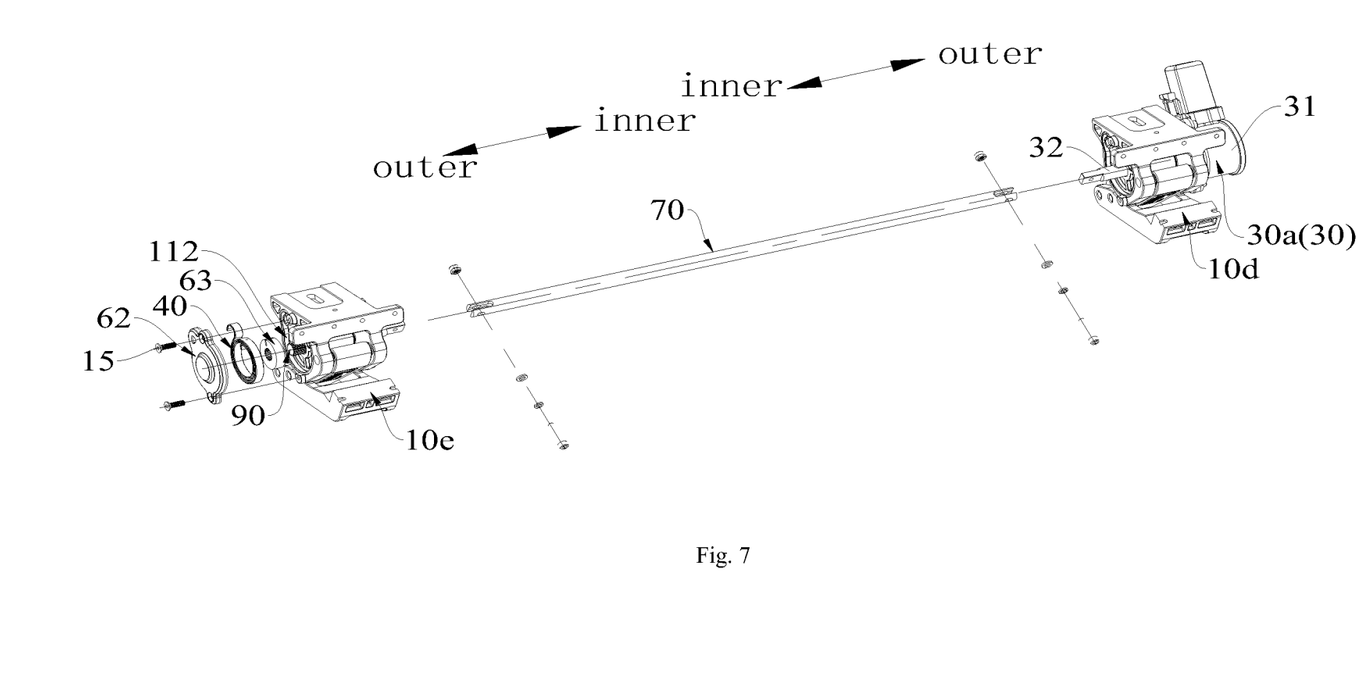
FIG. 7 is a schematic view of a vehicle step apparatus according to another embodiment of the present invention, wherein an extending and retracting device is in a retracting position.

As shown in FIG. 7, the motor shaft 32 rotates in the reverse direction and drives the transmission shaft 70 and one arm of the arm assembly 13 coupled with the motor shaft 32. The transmission shaft 70 drives one arm of the arm assembly 13 coupled with the transmission shaft 70, so that the two arm assemblies 13 transmit the driving force to the step bracket 12, and the step bracket 12 (i.e., the step 20) moves to the retracting position in the predetermined track, in which the elastic element 40 releases energy to reduce the load of the motor 30 in the process of driving the step 20 to retract, thus reducing the working current of the motor 30 in the process of driving the step 20 to retract.

A motor assembly 200 of the vehicle step apparatus 100 according to embodiments of the present invention will be described in the following with reference to FIG. 8.

Figure 8:
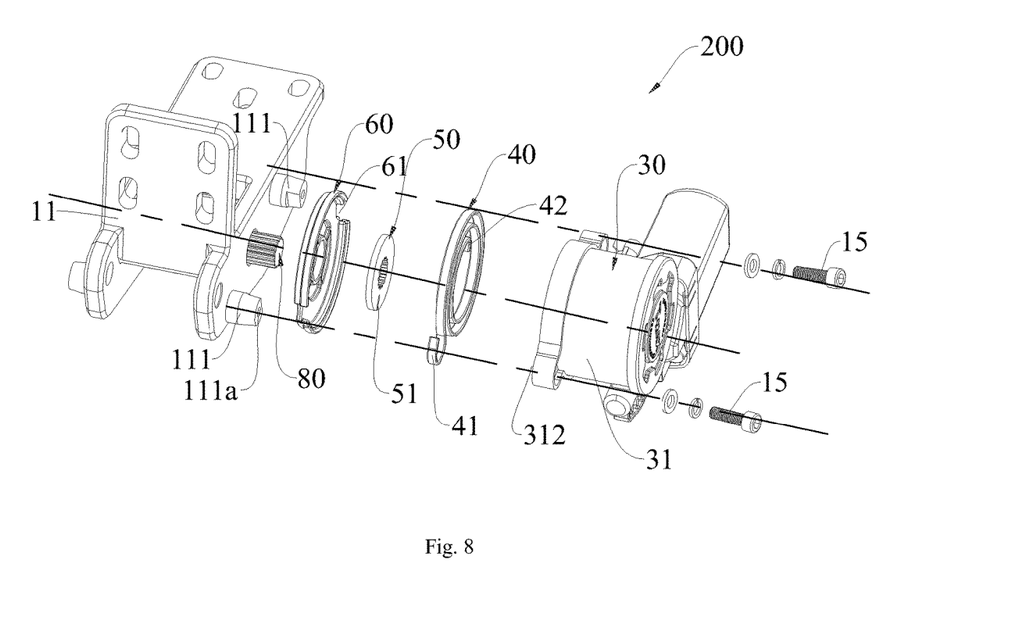
FIG. 8 is an exploded view of a motor assembly of a vehicle step apparatus according to an embodiment of the present invention.

As shown in FIG. 8, the motor assembly 200 of the vehicle step apparatus 100 according to embodiments of the present invention includes a motor 30, a first cover 60, a first connection plate 50 and an elastic element 40.

The motor 30 includes a motor shaft 32 and a casing 31. The first cover 60 is disposed on the casing 31 so as to define a cavity. The connection plate is disposed within the cavity and driven by the motor shaft 32 to rotate.

The elastic element 40 defines a first end coupled with the first cover 60 and a second end coupled with the first connection plate 50. The elastic element 40 is configured to be elastically deformed to store energy when the motor shaft 32 rotates in a first direction, and to release energy to assist the motor shaft 32 in rotating in a second direction opposite to the first direction when the motor shaft 32 rotates in the second direction. In some embodiments, the elastic element 40 may be a scroll spring. It may be understood that the number of the scroll spring is not limited to one.

With the motor assembly 200 according to embodiments of the present invention, when the motor shaft 32 rotates in the first direction, the motor shaft 32 drives the elastic element 40 to move, so that the elastic element 40 is deformed elastically to store energy. When the motor shaft 32 rotates in the second direction, the elastic element 40 releases energy to assist the motor 30 in driving the extending and retracting device 10 to retract, thus the load and working current of the motor 30 in the process of rotating in the second direction are decreased. Thus, the working current of the motor 30 in the process of driving the step 20 to retract is generally consistent with that of the motor 30 in the process of driving the step 20 to extend, so that the motor 30 is protected effectively and the working life of the motor assembly 200 is prolonged.

In an embodiment of the present invention, the first cover 60 is detachably fastened to the casing 31, and a limitation notch 61 is formed in the first cover 60. A limiting column 111 is formed on the mounting bracket 11, and the limiting column 111 is fitted within the limiting notch 61 to mount the first cover 60 on the mounting bracket 11.

It may be understood that, when the first direction is a forward rotation direction of the motor 30, the second direction is a reverse rotation direction of the motor 30, and at this time, a direction of rolling the scroll spring up tightly is consistent with the first direction.

When the extending and retracting device 10 is extended, the first end 41 of the scroll spring is fixed, and the second end 42 of the scroll spring rotates along with the motor shaft 32 and is twisted tightly to store energy. When the extending and retracting device 10 is retracted, the first end 41 of the scroll spring is fixed, and the second end 42 of the scroll spring rotates to loose itself so as to release energy, thus providing power for driving the retracting the extending and retracting device 10 to retract.

In the embodiment as shown in FIG. 8, a first catch groove 51 is formed in an outer peripheral surface of the first connection plate 20, and a second end 42 of the scroll spring is inserted into the first catch groove 51 and fitted therein, and a first end 41 of the scroll spring is fitted over the limiting column 111. The motor shaft 32 is coupled with the arm assembly 13 via a first connection shaft 80. The first connection shaft 80 is coupled with the motor shaft 32 via spline coupling, and the first connection plate 50 is fitted over the first connection shaft 80 and coupled with the first connection shaft 80 via spline coupling.

Therefore, the motor shaft 32 drives the first connection shaft 80 and the first connection plate 50 to rotate, and the second end 42 of the scroll spring fixed on the first connection plate 50 rotates along with the first connection plate 50, so that the scroll spring is gradually rolled up tightly, thus resulting in a simple and compact structure. In addition, the first connection shaft 80 is coupled with the motor shaft 32 and the first connecting plate 50 via spline connection so as to ensure driving force transmission and make installation and disassembly to be easy.

In some embodiments, a mounting hole 311 is formed in the casing 31, and the limitation column 111 is passed through the mounting hole 311. A threaded hole 111a is formed in the limitation column 111, and the motor 30 is mounted on the mounting bracket 11 via a bolt 15 fitted within the threaded hole 111a. Thus, the motor 30, the first connecting plate 50 and the mounting bracket 11 are mounted together via the bolt 15, and it is easy to change and maintain the scroll spring.

Operations of the arm assembly 200 of the vehicle step apparatus 20 according to embodiments of the present invention will be described in the following with reference to FIG. 8.

In the process of driving the step 20 to extend, the elastic element 40 is compressed to store energy, and the motor shaft 32 rotates in the first direction to drive the first arm 131 of the arm assembly 13 to rotate, so that the arm assembly 13 transmits the driving force to the step bracket 12, and the step bracket 12 moves to the extending position in a predetermined track.

In the process of driving the step 20 to retract, the elastic element 40 releases energy to assist the motor 30, and the motor shaft 32 to rotate in the second direction to drive the arm of the corresponding arm assembly 13 to rotate, so that the arm assembly 13 transmits the driving force to the step bracket 12, and the step bracket 12 moves to the retracting position in a predetermined track.

Since the elastic element 40 releases energy to decrease the load of the motor 30 in the process of driving the step 20 to retract, the working current of the motor 30 in the process of driving the step 20 to retract is decreased so as to balance the work current of the motor 30 in the process of driving the step 20 to retract with the work current of the motor 30 in the process of driving the step 20 to extend and to prolong work-life of the motor 30.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A vehicle step apparatus, comprising:
    a first extending and retracting device and a second extending and retracting device, each comprising a mounting bracket, a step bracket, and an arm assembly coupled between the mounting bracket and the step bracket and configured to drive the step bracket to move between an extending position and a retracting position;
    a step mounted on the step brackets of the first extending and retracting device and the second extending and retracting device;
    one motor mounted on the mounting bracket of the first extending and retracting device, and having a casing and a motor shaft coupled with the arm assemblies of the first extending and retracting device and the second extending and retracting device to drive the arm assemblies; and
    an elastic member configured to be elastically deformed so as to store energy when the motor drives the first and second extending and retracting devices to move towards the extending position, and to release energy so as to assist the motor to drive the extending and retracting devices when the one motor drives the first and second extending and retracting devices to move towards the retracting position, wherein the one motor is coupled with the arm assembly of the first extending and retracting device via a first connection shaft, and coupled with the arm assembly of the second extending and retracting device via a transmission shaft and a second connection shaft,
wherein the elastic element comprises a first scroll spring disposed at an outside of the mounting bracket of the second extending and retracting device away from the mounting bracket of the first extending and retracting device, and defining a fixed first end and a second end driven by the motor shaft via the transmission shaft to twist,
wherein a second recess is formed in the outside of the mounting bracket of the second extending and retracting device and covered by a second cover,
wherein a first end of the second connection shaft is connected to the transmission shaft, and a second end of the second connection shaft is extended beyond the outside of the mounting bracket of the second extending and retracting device,
wherein a second connection plate is fitted over and coupled with the second end of the second connection shaft via splined connection, and a second catch groove is formed in an outer circumferential surface of the second connection plate,
wherein a catch column formed on the outside of the mounting bracket of the second extending and retracting device is disposed in the second recess,
wherein the first scroll spring is disposed in the second recess, the first end of the first scroll spring is fitted over the catch column, and the second end of the first scroll spring is inserted into and fitted within the second catch groove.

2. The vehicle step apparatus according to claim 1, wherein the elastic element further comprises a second scroll spring disposed between the one motor and the mounting bracket of the first extending and retracting device, and defining a fixed first end and a second end driven by the motor shaft to twist.

3. The vehicle step apparatus according to claim 2, further comprising a first cover and a first connection plate,
wherein a first recess is formed in the casing, and the first cover covers the first recess to define a cavity,
wherein the first connection plate is mounted in the cavity and driven by the motor shaft to rotate,
wherein the second scroll spring is mounted within the cavity, the first end of the second scroll spring is fixed in the first cover, and the second end of the second scroll spring is coupled with the first connection plate.

4. The vehicle step apparatus according to claim 3, wherein the first cover is detachably fastened to the casing,
wherein a limitation notch is formed in the first cover, and a limitation column is formed on the mounting bracket of the first extending and retracting device, the limitation column is fitted within the limitation notch to mount the first cover on the mounting bracket of the first extending and retracting device,
wherein the first end of the second scroll spring is fitted over the limitation column.

5. The vehicle step apparatus according to claim 4, wherein a first catch groove is formed in an outer circumferential surface of the first connection plate, and the second end of the second scroll spring is inserted into and fitted within the first catch groove,
wherein the motor shaft is coupled with the first connection shaft via splined connection, and the first connection plate is fitted over the first connection shaft and coupled with the first connection shaft via splined connection.

6. The vehicle step apparatus according to claim 5, wherein a mounting hole is formed in the casing, and the limitation column is passed through the mounting hole,
wherein a threaded hole is formed in the limitation column, and the motor is mounted on the mounting bracket via a bolt fitted within the threaded hole.

7. The vehicle step apparatus according to claim 1, wherein the extending and retracting device is configured as one of a four-link mechanism, a five-link mechanism and a six-link mechanism.

8. A motor assembly of a vehicle step apparatus, comprising:
a motor comprising a motor shaft and a casing;
a cover disposed on the casing to define a cavity;
a connection plate disposed within the cavity and driven by the motor shaft to rotate; and
an elastic element defining a first end connected to the cover and a second end connected to the connection plate, and configured to be elastically deformed to store energy when the motor shaft rotates in a first direction and to release energy to assist the motor shaft to rotate in a second direction opposite to the first direction when the motor shaft rotates in the second direction,
wherein the elastic element comprises a scroll spring,
wherein the vehicle step apparatus comprises an extending and retracting device comprising a mounting bracket, a step bracket, and an arm assembly coupled between the mounting bracket and the step bracket and configured to drive the step bracket to move between an extending position and a retracting position,
wherein the motor shaft is connected to the arm assembly, the first direction is a rotation direction of the motor shaft when the step bracket moves towards the extending position, and the second direction is a rotation direction of the motor shaft when the step bracket moves towards the retraction position,
wherein the cover is detachably fastened to the casing,
wherein a limitation notch is formed in the cover, and a limitation column is formed on the mounting bracket, the limitation column is fitted within the limitation notch to mount the cover on the mounting bracket,
wherein a mounting hole is formed in the casing, and the limitation column is passed through the mounting hole,
wherein a threaded hole is formed in the limitation column, and the motor is mounted on the mounting bracket via a bolt fitted within the threaded hole.

9. The motor assembly of the vehicle step apparatus according to claim 8, wherein
a catch groove is formed in an outer circumferential surface of the connection plate, and the second end of the scroll spring is inserted into and fitted within the catch groove, the first end of the scroll spring is caught in the limitation notch;
the motor shaft is connected to the arm assembly via a connection shaft, the connection shaft is connected to the motor shaft via splined connection, and the connection plate is fitted over the connection shaft and coupled with the connection shaft via splined connection.

10. A vehicle step apparatus, comprising:
an extending and retracting device comprising a mounting bracket, a step bracket, and an arm assembly coupled between the mounting bracket and the step bracket and configured to drive the step bracket to move between an extending position and a retracting position;

a step mounted on the step bracket;

a motor mounted on the mounting bracket, and having a casing and a motor shaft coupled with the arm assembly to drive the arm assembly; and an elastic member configured to be elastically deformed so as to store energy when the motor drives the extending and retracting device to move towards the extending position, and to release energy so as to assist the motor to drive the extending and retracting device when the motor drives the extending and retracting device to move towards the retracting position, wherein the elastic element comprises a scroll spring defining a fixed first end and a second end driven by the motor shaft to twist, wherein the vehicle step apparatus further comprises a first cover and a first connection plate, wherein a first recess is formed in the casing, and the first cover covers the first recess to define a cavity, wherein the first connection plate is mounted in the cavity and driven by the motor shaft to rotate, wherein the scroll spring is mounted within the cavity, the first end of the scroll spring is fixed in the first cover, and the second end of the scroll spring is coupled with the first connection plate, wherein the first cover is detachably fastened to the casing, wherein a limitation notch is formed in the first cover, and a limitation column is formed on the mounting bracket, the limitation column is fitted within the limitation notch to mount the first cover on the mounting bracket, wherein the first end of the scroll spring is fitted over the limitation column, wherein a first catch groove is formed in an outer circumferential surface of the first connection plate, and the second end of the scroll spring is inserted into and fitted within the first catch groove, wherein the motor shaft is coupled with the arm assembly via a first connection shaft, the motor shaft is coupled with the first connection shaft via splined connection, and the first connection plate is fitted over the first connection shaft and coupled with the first connection shaft via splined connection, wherein a mounting hole is formed in the casing, and the limitation column is passed through the mounting hole, wherein a threaded hole is formed in the limitation column, and the motor is mounted on the mounting bracket via a bolt fitted within the threaded hole.

11. The vehicle step apparatus according to claim 10, wherein the extending and retracting device is configured as one of a four-link mechanism, a five-link mechanism and a six-link mechanism.

\* \* \* \* \*